US009168688B2

(12) United States Patent
Toshiaki

(10) Patent No.: US 9,168,688 B2
(45) Date of Patent: Oct. 27, 2015

(54) INJECTION MOLDING DEVICE, INJECTION MOLDING METHOD AND HOUSING

(75) Inventor: Kano Toshiaki, Tokyo (JP)

(73) Assignee: NEC Personal Computers, Ltd, Tokyo (JP)

( * ) Notice: Subject to any disclaimer, the term of this patent is extended or adjusted under 35 U.S.C. 154(b) by 352 days.

(21) Appl. No.: 13/638,655

(22) PCT Filed: Mar. 3, 2011

(86) PCT No.: PCT/JP2011/054995
§ 371 (c)(1),
(2), (4) Date: Dec. 10, 2012

(87) PCT Pub. No.: WO2011/122236
PCT Pub. Date: Oct. 6, 2011

(65) Prior Publication Data
US 2013/0078403 A1  Mar. 28, 2013

(30) Foreign Application Priority Data
Mar. 30, 2010  (JP) ................................. 2010-076472

(51) Int. Cl.
*B29C 45/14*  (2006.01)
(52) U.S. Cl.
CPC ..... *B29C 45/14008* (2013.01); *B29C 45/14221* (2013.01); *B29C 2045/14188* (2013.01); *Y10T 428/1397* (2015.01)
(58) Field of Classification Search
CPC .................. B29C 45/14008; B29C 45/14221; B29C 2045/14188
See application file for complete search history.

(56) References Cited

U.S. PATENT DOCUMENTS

| 5,223,201 A * | 6/1993 | Masui et al. ................ 264/163 |
| 5,759,588 A * | 6/1998 | Harada ........................ 425/111 |
| 6,183,680 B1 * | 2/2001 | Hara et al. ................... 264/163 |
| 6,207,090 B1 * | 3/2001 | Knisely et al. .............. 264/138 |
| 6,849,225 B1 * | 2/2005 | Gilbert et al. ............... 264/511 |

FOREIGN PATENT DOCUMENTS

| JP | 3-236921 A | 10/1991 |
| JP | 9-234769 A | 9/1997 |
| JP | 2003-220623 A | 8/2003 |
| JP | 2009-113245 A | 5/2009 |

OTHER PUBLICATIONS

International Search Report mailed May 17, 2011 for Application No. PCT/JP2011/054995.

* cited by examiner

*Primary Examiner* — Robert B Davis
(74) *Attorney, Agent, or Firm* — Nutter McClennen & Fish LLP; John J. Penny, Jr.; Joshua I. Rudawitz

(57) ABSTRACT

There is provided an injection molding device in which the film cutoff and the injection molding can be conducted in one process without fine positional adjustment of the stopper and the shape of the edge surface of the member is not limited to the shape of the cutting blade.
Resin is injected between a film (8) arranged on a cavity (1) as a metallic mold including a depression-shaped portion and a core (2) as a metallic mold including a projection-shaped portion to be inserted in the depression-shaped portion of the cavity (1), to thereby form a member; the cavity (1) includes a cutting blade (7) in an outer edge of the depression-shaped portion to cut off the film (8) arranged to project toward an outside plane of the depression-shaped portion; the core (2) includes an edge (3) in an outer edge of the projection-shaped portion to form an edge surface of the member; and when the core (2) is inserted in the cavity (1), the film (8) nipped by the cutting blade (7) and the edge (3) is cut off.

5 Claims, 3 Drawing Sheets

INJECTION MOLDING DEVICE, INJECTION MOLDING METHOD AND HOUSING

TECHNICAL FIELD

The present invention relates to an injection molding device which injects resin to fill it in metallic molds to thereby form it into a desired shape, and in particular, to an injection molding device which injects resin in metallic molds with a film mounted thereon to form an article with a surface decorated by the film.

BACKGROUND ART

The injection molding device which injects resin to fill it in metallic molds to form it into a desired shape is capable of stably forming the resin into even a complex shape, and is hence employed to produce various members including parts of articles for daily use and electronic appliances.

A so-called insert molding device which inserts a film in metallic molds for injection molding and injects resin in the molds to thereby form a desired member makes it possible to also conduct surface decoration by the film in the same process as the member forming process, and hence is employed to produce housings and exterior trim items for electronic appliances, interior trim members for cars, and the like.

The film to be inserted in the molds in the insert molding is generally in an elongated form wound up in the shape of a roll or is a sheet of film having a predetermined size not associated with a member to be formed; hence, in a state in which the film is inserted and the injection is conducted thereto, the film is not appropriate for the use as a member. That is, a remaining portion of the film exceeding the size of the molds fixes onto a periphery of the member.

To avoid such state, the remaining portion of the film is cut off after the injection molding in some cases. Further, the injection molding is conducted depending on cases after the film which is beforehand shaped to conform to the shape of the molds in advance and which is trimmed to match the size of the molds is inserted in the molds. When these schemes are employed, a second process is disposed before and after the injection molding, making the processes complicated; hence, these schemes are not suitable for mass-production and cost reduction.

On the other hand, Patent Document 1 describes an injection molding device which inserts a film including the remaining portion thereof in the metallic molds to achieve cutoff of the film and the injection molding in one process.

PRIOR ART REFERENCE

Patent Document

Patent Document 1: Japanese Patent Laid-Open Ser. No. 2009-113245

SUMMARY OF THE INVENTION

Problems to be Solved by the Invention

An injection molding device described in Patent Document 1 includes a stopper in a moving mechanism of a core not to hurt, when injecting resin between a core and a decoration film while holding the decoration film between the core (upper metallic mold) and a cavity (lower metallic mold) in a half-clamped state, the decoration film by pushing too much the core including a cutting blade disposed in a periphery thereof.

When the injection molding device is configured as described above, the film cutoff and the injection molding can be carried out in one process; however, since it is required to hold the film by applying force, which does not cut off the film, to a tip edge of the cutting blade, fine positional adjustment of the stopper is required. In addition, since the shape of an edge surface of a member to be injection-molded is the shape of the cutting blade, the members which can be molded are insufficient in the degree of freedom.

Therefore, the present invention has an object to provide an injection molding device, an injection molding method, and a housing in which the film cutoff and the injection molding can be conducted in one process without fine positional adjustment of the stopper and the shape of the edge surface of the member is not limited to the shape of the cutting blade.

Means for Solving to the Problems

The injection molding device in accordance with the present invention is an injection molding device which injects resin between a film arranged on a cavity as a metallic mold including a depression-shaped portion and a core as a metallic mold including a projection-shaped portion to be inserted in the depression-shaped portion of the cavity, to thereby form a member, characterized in that the cavity includes a cutting blade in an outer edge of the depression-shaped portion to cut off the film arranged to project toward an out-side plane of the depression-shaped portion; the core includes an edge in an outer edge of the projection-shaped portion to form an edge surface of the member; and when the core is inserted in the cavity, the film nipped by the cutting blade and the edge is cut off.

The injection molding method in accordance with the present invention is an injection molding method, characterized by comprising a film arranging step of arranging a film on a cavity as a metallic mold including a depression-shaped portion; a film holding step of inserting a core as a metallic mold including a projection-shaped portion in the cavity to thereby hold the film between a film holder arranged outside the projection-shaped portion of the core and an out-side plane of the depression-shaped portion of the cavity; a film cutoff step of further inserting the core in the cavity to thereby cut off the film nipped by a cutting blade disposed in an outside edge of the depression-shaped portion of the cavity and an edge disposed in the projection-shaped portion of the core; and a resin injection step of injecting resin between the film and the projection-shaped portion of the core.

The housing in accordance with the present invention is a housing formed by injecting resin between a film arranged on a cavity as a metallic mold including a depression-shaped portion and a core as a metallic mold including a projection-shaped portion to be inserted in the depression-shaped portion of the cavity, characterized in that the film is cut of after the film is arranged on the cavity and before the resin is injected; and a plane in which the resin is exposed in contact with a location of the cutoff of the film does not have a shape of a cutting blade to cut off the film.

Advantageous Effects of the Invention

In accordance with the present invention, it is possible to provide an injection molding device, an injection molding method, and a housing in which the film cutoff and the injection molding can be conducted in one process without fine positional adjustment of the stopper and the shape of the edge surface of the member is not limited to the shape of the cutting blade.

DESCRIPTION OF THE EMBODIMENTS

Figure 1:
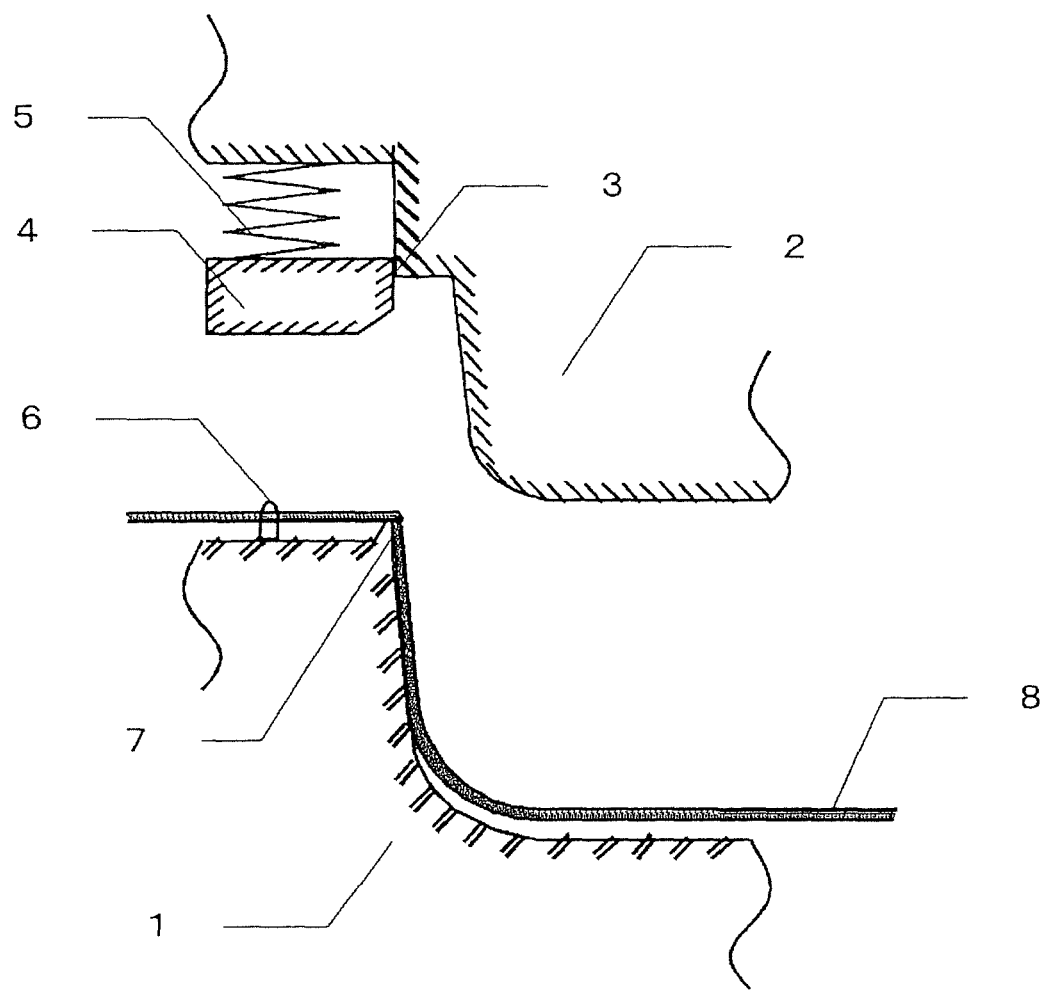
FIG. 1 is a diagram showing a state in which a film 8 is inserted in the metallic molds of an injection molding device of the present embodying mode.

Next, referring to the drawings, description will be given in detail of a mode of embodying the present invention. This embodying mode is an injection molding device in which the cutoff of the film 8 and the injection molding is conducted in one process, but a mechanism to inject resin and a mechanism to move the core 2 up and down are feasible by mechanisms similar to those of the general injection molding device, and since these items are obvious to those skilled in the art, description thereof will be skipped.

FIG. 1 is a diagram showing a state in which the film 8 is inserted in the metallic molds of an injection molding device of the present embodying mode.

Referring to FIG. 1, the injection molding device of the present embodying mode includes a cavity 1, a core 2, an edge 3, a film holder 4, a spring 5, a pin 6, and a cutting blade 7, and a film 8 is inserted in the metallic molds.

The cavity 1 and the core 2 are respectively metallic molds, and a space formed by inserting the core 2 in the cavity 1 defines an outer shape of a member to be injection-molded. The cavity 1 has a depression shape and is fixed. The core 2 has a projection shape and is supported to be inserted in and to be removed from the cavity 1 and it is possible to inject resin from an injection port, not shown.

The edge 3 is an outer edge of the projection-shaped portion of the core 2 and makes contact with the cavity 1 to form an edge portion of the member when the core 2 is inserted in the cavity 1.

The film holder 4 is arranged via the spring 5 outside the edge 3 of the core 2 and is inserted in and is removed from the cavity 1 in association with the movement of the core 2. The film holder 4 includes, in order that the film holder 4 and the cavity 1 nip and hold the film 8, material having predetermined hardness and friction according to the film 8. For example, the film holder 4 may include stainless alloy and lubber. When the film holder 4 has a shape corresponding to the shape of the cutting blade 7, which will be described later, in the outer edge of the portion of the cavity 1 in which the core 2 is inserted, the film 8 can be held at a more correct position.

The pin 6 is a projection disposed at a location which is outside the depression-shaped portion of the cavity 1 and toward which the core 2 is inserted. When an opening is arranged at a corresponding position of the film 8 such that the pin 6 enters the opening, it is possible to more securely hold the film at the correct position.

The cutting blade 7 is a blade capable of cutting off the film 8 and is disposed to project at a location which is outside the depression-shaped portion of the cavity 1 and toward which the core 2 is inserted such that an edge of the blade thereof faces the core 2 being inserted.

The film 8 is a film as the exterior trim of the member and may include ABS resin, polycarbonate resin, and the like. In the state of FIG. 1, the film 8 is beforehand shaped to match the depression-shaped portion of the cavity 1 and is arranged to be apart from the depression-shaped portion of the cavity 1 by the height equal to or more than the height for which the cutting blade 7 projects from the outer edge of the cavity 1; however, it is sufficient only if it is apart therefrom by the height substantially equal to the height for which the cutting blade 7 projects from the outer edge of the cavity 1.

Figure 2:
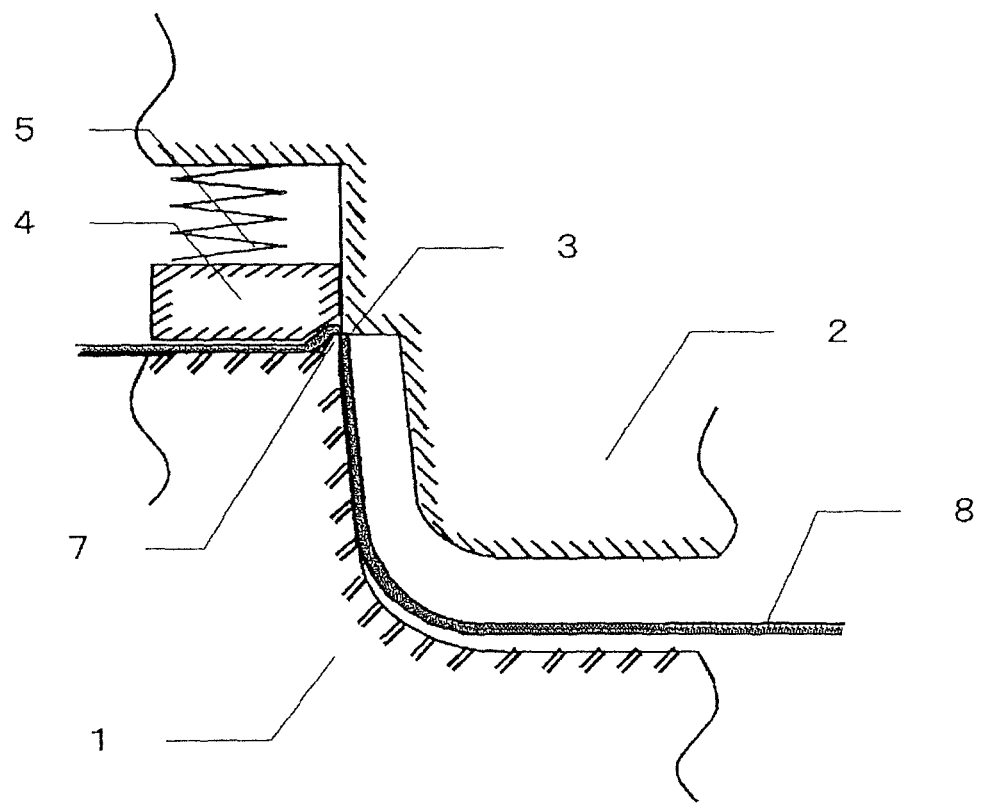
FIG. 2 is a diagram showing a state in which the film 8 inserted in the metallic molds of an injection molding device of the present embodying mode is nipped by a cavity 1 and a core 2.

FIG. 2 is a diagram showing a state in which the film 8 inserted in the metallic molds of the injection molding device of the present embodying mode is nipped between the cavity 1 and the core 2.

FIG. 2 shows a state in which the core 2 is inserted in the cavity 1 up to an intermediate point. In this situation, the film holder 4 is pushed by the spring 5 toward the outside of the depression-shaped portion of the cavity 1 and is holding the film 8 existing between the film holder 4 and the cavity 1. Also, the film 8 is nipped between the edge 3 and the cutting blade 7.

In the state of FIG. 2, the pin 6 is inserted into the film holder 4 in a state in which the pin 6 passes through the film 8, and is hence not shown. The insertion into the film 8 is enabled by disposing an opening at a corresponding position of the film holder 4, but this is not limitative.

Figure 3:
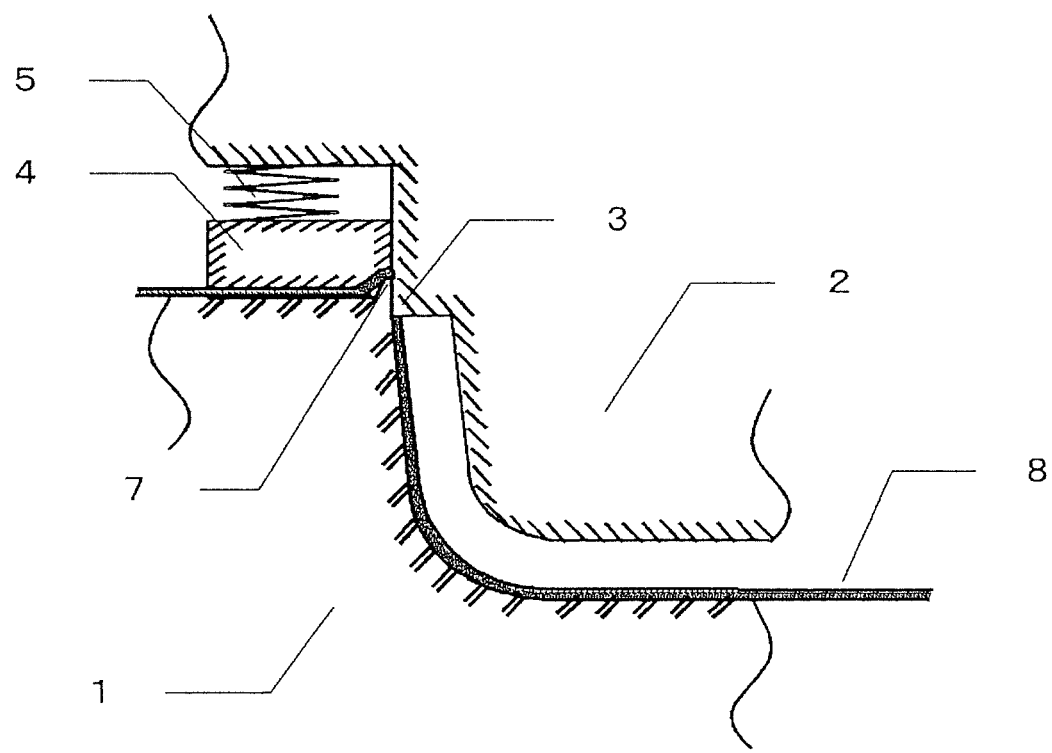
FIG. 3 is a diagram showing a state in which the film 8 inserted in the metallic molds of an injection molding device of the present embodying mode is cut off by the cavity 1 and the core 2.

FIG. 3 is a diagram showing a state in which the film 8 inserted in the metallic molds of the injection molding device of the present embodying mode is cut off by the cavity 1 and the core 2.

FIG. 3 shows a state in which the core 2 is fully inserted in the cavity 1. In this situation, the film 8 is cut off by the edge 3 and the cutting blade 7 and is pushed into the inside of the cavity 1 by the edge 3 to be completely and tightly fixed onto the cavity 1.

By constructing the injection molding device as above, the cutoff of the film 8 and the injection molding can be carried out in one process without performing the fine positional adjustment of the stopper. Additionally, the shape of the edge surface of the member to be injection-molded is not restricted by the shape of the cutting blade 7.

Incidentally, the embodying mode described above is a favorable embodying mode of the present invention and the range of the present invention is not limited only to the embodying mode described above, and it is applicable in modes obtained through various changes within a range not departing from the gist of the present invention This application is based upon and claims the benefit of priority from Japanese patent application No. 2010-076472, filed on Mar. 30, 2010, the disclosure of which is incorporated herein its entirety by reference.

DESCRIPTION OF REFERENCE NUMERALS

1 Cavity
2 Core
3 Edge
4 Film holder
5 Spring
6 Pin
7 Cutting blade
8 Film

The invention claimed is:

1. An injection molding device which injects resin between a film arranged on a cavity as a metallic mold including a depression-shaped portion and a core as a metallic mold including a projection-shaped portion to be inserted in the depression-shaped portion of the cavity, to thereby form a member, characterized in that:

the cavity includes a cutting blade in an outer edge of the depression-shaped portion to cut off the film wherein the cutting blade includes a projection-shaped portion that projects toward an outside plane of the depression-shaped portion;

the core includes an edge in an outer edge of the projection-shaped portion to form an edge surface of the member, and a film holder which is in sliding contact with a surface of the projection-shaped portion and disposed outside the projection-shaped portion to face the outside plane of the depression-shaped portion of the cavity and which is energized to push the cavity when the core is inserted in the cavity, wherein the film holder includes a depression-shaped portion having a shape corresponding to the projection-shaped portion of the cutting blade; and when the core is inserted in the cavity, the film held between the projection-shaped portion of the cutting blade and the depression-shaped portion of the film holder, the film nipped by the cutting blade and the edge is cut off.

2. An injection molding device in accordance with claim 1, comprising a pin projecting toward the core, on the outside plane.

3. An injection molding method using the injection molding device of claim 1, comprising:

a film arranging step of arranging a film on the cavity;

a film holding step of inserting the core in the cavity to thereby hold the film between the projection-shaped portion of the cutting blade and the depression-shaped portion of the film holder;

a film cutoff step of further inserting the core in the cavity to thereby cut off the film nipped by the cutting blade and the edge; and a resin injection step of injecting resin between the film and the projection-shaped portion of the core.

4. An injection molding method in accordance with claim 3, comprising a film pushing step, between the film cutoff step and the resin injection step, of further inserting the core in the cavity such that the film is pushed by the edge in the cavity.

5. An injection molding device in accordance with claim 1, wherein after the film is cut off and the core is further inserted in the cavity, the edge moves along the depression-shaped portion of the cavity.

* * * * *